No. 789,335. PATENTED MAY 9, 1905.
T. PASCOE.
ADJUSTABLE SCOOP FOR SCRAPING, LIFTING, AND CARRYING GROUND, &c.
APPLICATION FILED OCT. 4, 1904.
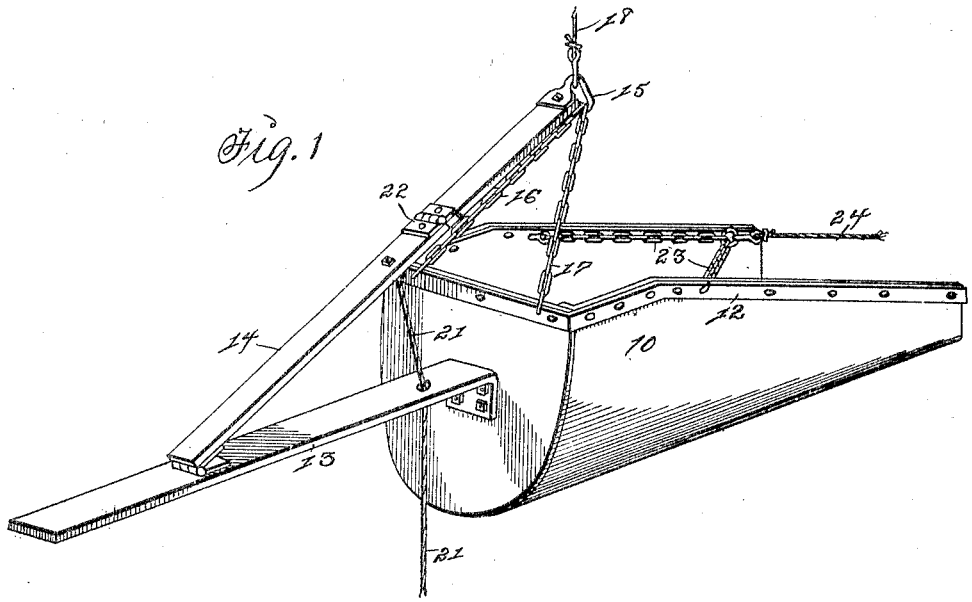
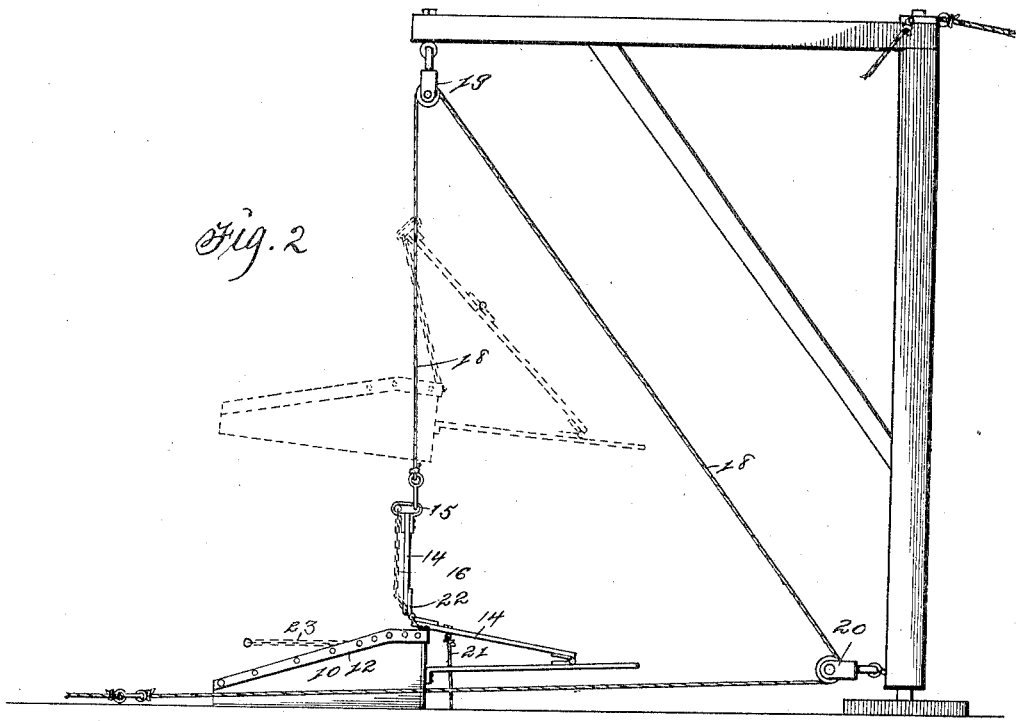
Witnesses:
L. L. Leibrock
R. C. Craig
Inventor: Theophilus Pascoe,
By Thomas G. Orwig, Attorney.

No. 789,335.

Patented May 9, 1905.

UNITED STATES PATENT OFFICE.

THEOPHILUS PASCOE, OF SHEFFIELD, IOWA.

ADJUSTABLE SCOOP FOR SCRAPING, LIFTING, AND CARRYING GROUND, &c.

SPECIFICATION forming part of Letters Patent No. 789,335, dated May 9, 1905.

Application filed October 4, 1904. Serial No. 227,172.

*To all whom it may concern:*

Be it known that I, THEOPHILUS PASCOE, a citizen of the United States, residing at Sheffield, in the county of Franklin and State of Iowa, have invented a new and useful Adjustable Scoop for Scraping, Lifting, and Carrying Ground, &c., of which the following is a specification.

My object is to provide means specially adapted for operating a scoop by hitching a horse thereto to pull it like a scraper to be filled with ground and then lifted by means of a crane and carried and dumped by pulling a rope, as required, to save time and labor in making excavations and in moving ground or other substances that can be lifted by the scoop to be carried and deposited in another location or loaded upon wagons or cars.

My invention consists in the construction, arrangement, and combination of parts, as hereinafter set forth, pointed out in my claims, and illustrated in the accompanying drawings, in which—

Figure 1 is a perspective view of the scoop and operating mechanism combined therewith. Fig. 2 shows the scoop connected with the arm of a crane, as required when in practical use.

The numeral 10 designates a metal scoop that may vary in size and configuration. Its top edge is reinforced by a metal bar 12, riveted thereto and provided with apertures for connecting chains therewith. A rigid handle 13 is fixed to its rear and closed end to extend rearward, as shown, for manually holding and adjusting the scoop when in use for scraping and scooping ground, grain, &c., to be lifted and carried therein from one place to another. A jointed brace 14 is hinged on top of the central portion of the handle and provided with a loop 15 at its free end. Chains 16 and 17 are connected with the loop and the rear end and top of the scoop, as shown in Fig. 1, or in any suitable way, in such a manner that they can be stretched taut when the scoop is suspended from the arm of a crane by means of a rope 18, connected with the loop 15 and extended over direction-pulleys 19 and 20, as shown in Fig. 2, for detachably hitching a horse to the end of the rope. A rope 21 is fixed to the brace 14 below its joint 22 in such a manner that when the scoop is loaded and elevated and in position to be emptied pulling down on the rope will bend the brace downward at its joint and allow the open end of the scoop to drop downward, as required, to dump its contents therefrom. A chain 23 is connected with the parallel sides and top edge of the scoop, preferably adjustably, in such a manner that a rope 24 can be detachably connected with the center of the chain, as shown in Fig. 1, and a horse hitched to the rope for operating the scoop like a scraper to fill it with ground or other matter adapted to be scraped into and lifted and carried by the scoop.

In the practical use of my invention it is obvious a person can take hold of the handle 13 to govern the scoop when it is moved forward by horse-power, as required, to fill the scoop with ground or grain, and when filled the horse is detached from the rope 24 and hitched to the rope 18 for elevating the loaded scoop so it can be carried by means of the arm of a crane to be emptied in another location by simply pulling on the rope 21.

Having thus set forth the purpose of my invention and the construction, arrangement, and combination of all its parts, the practical operation and utility thereof will be readily understood by persons familiar with the art to which it pertains.

What I claim as new, and desire to secure by Letters Patent, is—

1. A scoop having a handle fixed to its rear end to extend rearward, a jointed brace hinged on top of the handle and the free end of the brace adjustably connected with the rear end of the scoop, for the purposes stated.

2. A scoop, a handle fixed to the rear and closed end of the scoop to extend rearward, a jointed brace hinged to the central portion of the handle and provided with a fixed loop at its free end, chains connected with the loop and with the top and rear end of the scoop and means for adjusting the jointed brace, arranged and combined to operate in the manner set forth for the purposes stated.

3. A scoop for scraping, lifting and carrying ground from one location to another, comprising a scoop that is closed at its rear end, a rigid handle fixed to its rear end to extend rearward, a jointed brace hinged on top of the handle, chains connected with the free end of the brace and the top and rear end of the scoop, a rope connected with the jointed lever, means for connecting the free end of the jointed brace with the arm of a crane and means for hitching a horse to the front of the scoop, arranged and combined to operate in the manner set forth for the purposes stated.

THEOPHILUS PASCOE.

Witnesses:
C. E. MEADER,
C. J. LE VALLEY.